March 23, 1943.  J. W. DAWSON ET AL  2,314,691

WELDING APPARATUS

Filed June 13, 1939   6 Sheets-Sheet 1

WITNESSES:
James F. Young
Hyman Diamond

INVENTORS
John W. Dawson and
Ralph N. Stoddard.
BY
F. W. Lyle
ATTORNEY

March 23, 1943.    J. W. DAWSON ET AL    2,314,691
WELDING APPARATUS
Filed June 13, 1939    6 Sheets-Sheet 2
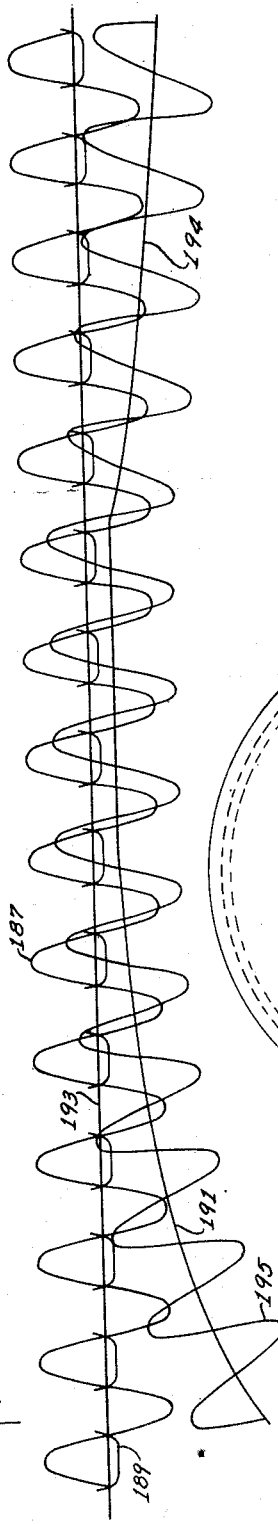
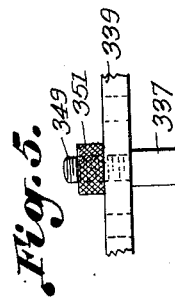
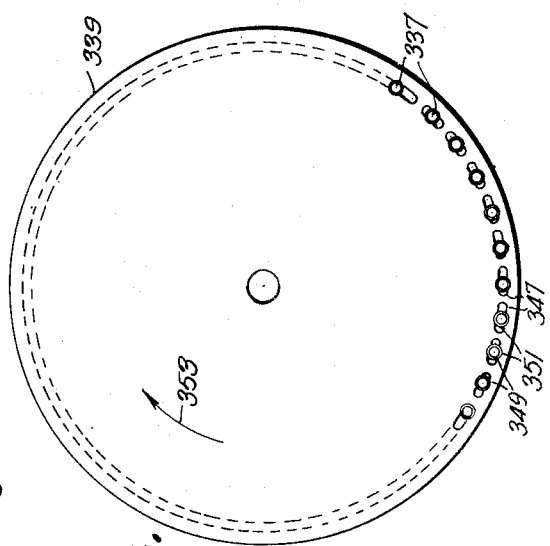
INVENTORS
John W. Dawson and
Ralph N. Stoddard.
BY
F. W. Syle
ATTORNEY March 23, 1943. J. W. DAWSON ET AL 2,314,691
WELDING APPARATUS
Filed June 13, 1939 6 Sheets-Sheet 3

INVENTORS
John W. Dawson and
Ralph N. Stoddard.
BY F. W. Lyle.
ATTORNEY

March 23, 1943.  J. W. DAWSON ET AL  2,314,691
WELDING APPARATUS
Filed June 13, 1939    6 Sheets-Sheet 6
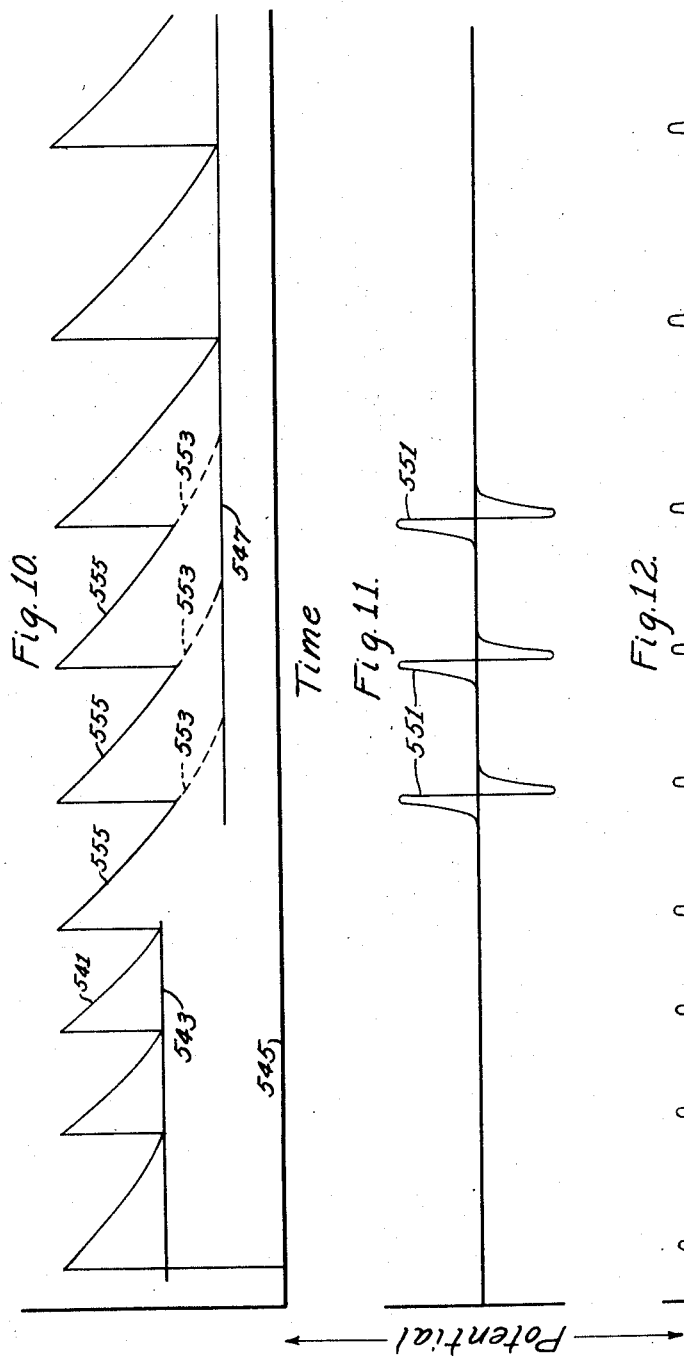
INVENTORS
John W. Dawson and
Ralph N. Stoddard.
BY
F. W. Lyle
ATTORNEY
WITNESSES:
James F. Young Patented Mar. 23, 1943

2,314,691

UNITED STATES PATENT OFFICE 2,314,691

WELDING APPARATUS

John W. Dawson, Auburndale, Mass., and Ralph N. Stoddard, East Orange, N. J., assignors to Westinghouse Electric & Manufacturing Company, East Pittsburgh, Pa., a corporation of Pennsylvania Application June 13, 1939, Serial No. 278,830

14 Claims. (Cl. 219—4)

Our invention relates to electric discharge apparatus and has particular relation to welding apparatus.

In resistance welding, the objects to be welded together are connected through suitable welding electrodes to a power source and sufficient current is transmitted through the electrodes and the objects to melt and fuse the material of which they are constituted. After the fused areas in the material harden the desired solid junction between the objects is formed. With welding apparatus of other types such as that used for flash and arc welding, the procedure followed is analogous.

We have found that in welding generally and in resistance welding in particular, the quality of the weld formed may be considerably improved by pre-heating the region of the material through which the welding current is transmitted. The extent and character of the pre-heating depends on the properties of the material which is welded and if the objects are moved, as is the case for stainless steel sheets in the manufacture of airplane windings, for example, on the speed of movement. In particular, the character of the pre-heating is dependent on the specific heat and the conductivity of the material. Under certain circumstances, it is desirable that the pre-heating should progress until the material is well softened. Under such circumstances, it is to be noted that if the material is of low heat capacity and of high conductivity substantial energy must be supplied. In other cases the pre-heating need not progress very far. All that is necessary is that the material be heated sufficiently to prevent fissures or other inhomogeneities from developing in the areas surrounding the welded regions by reason of sudden application of welding current or welding heat.

We have also found that the quality of the resistance weld produced is substantially improved by annealing. This object is accomplished by heating the region which has been melted and fused for some time after the fusion has taken place. The character of the annealing which is applied in any case is dependent on the heat properties of the material being treated and also on the mechanical properties which it is desired that the welded material have after being subjected to the treatment.

In modern industry, the welding process is applied to a great multitude of materials having properties which vary over a vast range. To provide for the necessities of so wide a range of materials the adaptability and flexibility of the pre-heating and annealing arrangements must be correspondingly large.

It is an object of our invention to provide a welding system in which the material treated shall be pre-heated.

Another object of our invention is to provide a welding system in which the material treated shall be annealed.

A more particular object of our invention is to provide welding apparatus having facilities for pre-heating or annealing the material treated which shall be adaptable with facility to the treatment of materials having properties which differ vastly and to the production of welds having mechanical properties differing over a wide range.

A further particular object of our invention is to provide a control system for welding apparatus by the operation of which the material treated shall be pre-heated or annealed or both pre-heated and annealed in a manner corresponding to the properties of the material and the characteristics desired in the final weld.

A more specific object of our invention is to provide a welding system in which pre-heating or annealing or both take place by supplying current of magnitude less than the welding magnitude in the region of the weld, the variation in the current as a function of time being pre-set in accordance with the properties of the material welded and the desired characteristics of the weld.

Another specific object of our invention is to provide a welding system having a minimum of moving parts with which it shall be possible to pre-heat and anneal the region in which the welding takes place.

A further specific object of our invention is to provide a welding by the operation of which current substantially less than the welding current but of substantially constant value shall be applied in the intervals between the application of the welding current.

A still further specific object of our invention is to provide a welding system by the operation of which the current which flows in the interval between the application of the actual welding current shall be increased to the welding current value from a small value before the welding interval and shall be decreased from the welding current value to a small value after the welding interval.

A general object of our invention is to provide a control system for supplying a load that requires power in intermittent pulses which shall function to provide power of smaller magnitude than the load power during the intervals between the pulses.

Another general object of our invention is to provide apparatus for supplying a load that requires current in intermittent pulses which shall function to provide current varying in a predetermined manner during the intervals between the pulses.

An ancillary object of our invention is to provide a novel frequency converting arrangement capable of supplying potentials of different frequencies.

More concisely stated, it is an object of our invention to provide welding apparatus, particularly resistance welding apparatus, of simple structure for supplying current for welding that shall vary in a manner predetermined by the character of the material welded and the desired properties of the final weld.

According to our invention, we apply the preheating and annealing energy by impressing current of a magnitude less than the welding current in the region of the weld. The variation of this current as a function of time depends on the properties of the material to be welded and the characteristics of the desired weld. It is preferably in each case determined empirically by producing several welds, testing them for their properties and adjusting the settings which determine the current flow to correspond to the results of the tests.

In accordance with the broader aspects of our invention, it may be said that the current supplied between the application of welding impulses is merely less than the actual welding current, but still of a substantial value. As regards the actual magnitude of the annealing and pre-heating current it may be said that, depending on the properties of the material welded, the current may be maintained substantially constant or may be gradually increased to the welding value from zero for pre-heating purposes and gradually decreased from the welding value to zero for annealing purposes. Of course, the pre-heating and annealing current may also vary in other ways. For example, the pre-heating current may be gradually decreased from an initial substantial value and the welding current applied when the pre-heating current has been reduced to a small value. And so also the annealing current may drop to a low value immediately on the termination of the welding current flow and may gradually rise to a substantial value. Both the preheating and annealing current may also fluctuate between a series of values during the performance of each welding operation or they may be constant.

In accordance with our invention, various systems are provided for attaining pre-heating and annealing currents having the different desired functional characteristics. Welding apparatus in which the welding current is supplied from an alternating source through electric discharge valves lends itself with particular facility to preheating and annealing functions. To produce pre-heating or annealing by gradual increase of the current from a low value to a substantial value, a composite potential made up of a fixed periodic potential superimposed on a gradually increasing potential is applied to control the valves. As the latter potential rises, the net control potential recurrently increases above the critical potential for the valves at instants earlier and earlier in the periods of the source from which the welding current is supplied. After the welding current has been supplied for a predetermined time interval one of the components of the potential gradually decreases. In such a case the control potential for the valves is exceeded later and later in the half periods until the current flow through the material to be welded is reduced to zero.

In accordance with another modification of our invention, the electric discharge valves through which the welding current is supplied is rendered conductive by the application of potential impulses from an electrical or a magnetic impulsing device. The impulsing arrangement is customarily provided with moving elements which produce the impulses and they are so set that the preheating or annealing current has the desired variation as a function of time.

Finally, an arrangement is provided in accordance with our invention which incorporates only minor mechanical moving parts. By the operation of this arrangement, the current provided during each welding cycle increases from zero to the welding value gradually, remains at the welding value for a desired interval of time and decreases from the welding value to zero gradually. For the purpose of controlling the valves in this arrangement, an inverter circuit of variable frequency is provided. The inverter is first operated at a frequency somewhat greater than the frequency of the source for a predetermined interval of time. During this interval the valves are rendered conductive gradually earlier in the periods of the source until the current supplied through the welding load is at the welding value. At this point the inverter is locked in synchronism at the frequency of the source for a predetermined time, and the welding current flows during this time. Finally the synchronizing frequency is removed and the inverter is operated at a frequency greater than the frequency of the source for a predetermined interval of time. During the later interval, the valves are rendered conductive later and later in the periods of the source until the current flow through the welding load is reduced to a low value. This process may be repeated at will.

The novel features that we consider characteristic of our invention are set forth with particularity in the appended claims. The invention itself, however, both as to its organization and its method of operation, together with additional objects and advantages thereof will best be understood from the following description of specific embodiments when read in connection with the accompanying drawings, in which:

Fig. 2 is a graph illustrating the operation of Fig. 1;

Fig. 4 is a plan view showing a disc utilized in the modification shown in Fig. 3;

Fig. 5 is a view in side elevation showing a pin used in the disc shown in Fig. 4;

Figs. 10 to 12 are graphs illustrating the operation of the apparatus shown in Fig. 6.

Figure 1:
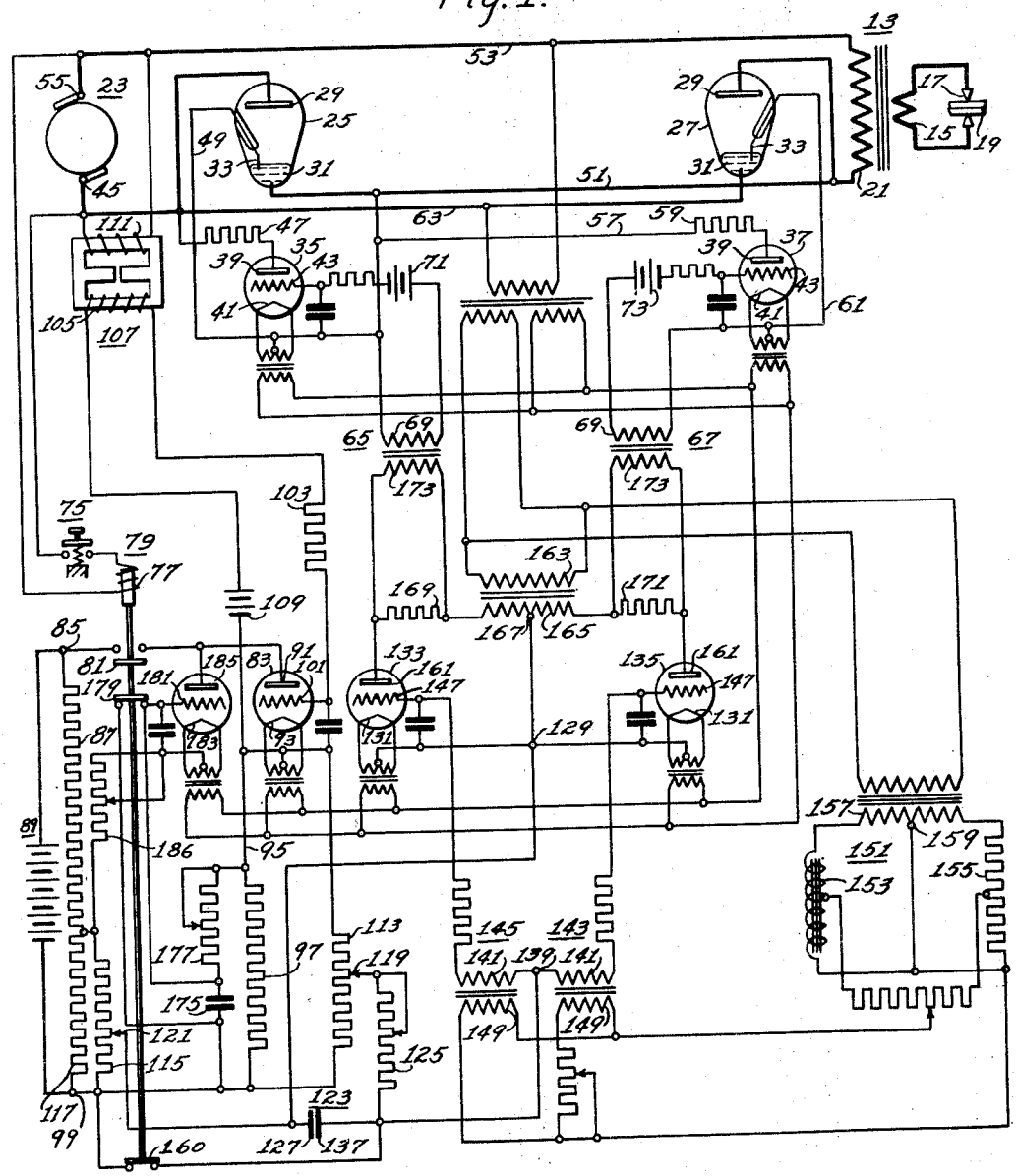
Figure 1 is a diagrammatic view showing an embodiment of our invention.

The apparatus shown in Figure 1 comprises a welding transformer 13 from the secondary 15 of which a pair of welding electrodes 17 is supplied. The material 19 to be welded passes between the electrodes 17 and current is transmitted through the material and the electrodes as the transformer 13 is energized.

The movement of the material 19 between the electrodes 17 may be intermittent or continuous depending on the character of the welding operation involved. For example, the material may be advanced intermittently like a motion picture film. In this case the preferred practice of our invention is to supply the welding current and the annealing or pre-heating current during the rest intervals when the material is not in motion; that is, to effect a spot weld. In many cases, however, it is desirable to supply the pre-heating or annealing current while the material is moving and only the welding current when the material is at rest. The material may also have a periodically varying speed; it may be advanced rapidly between welds and slowly during the welding operation. In this case also the timing of the flow of pre-heating welding and annealing current is adjustable to satisfy the requirements of the welding problem involved. Finally the material may be moved continuously. Whatever the character of the motion of the material, 19, it may be attained by suitable advancing rollers similar to those used in the metal rolling industry. Where there is to be a predetermined relationship between the movement of the material and the supply of power for welding, the movement of the material may be synchronized with the welding power by rotating the rolls (through suitable intermittent mechanisms as Geneva movements where necessary) from a synchronous motor.

The primary 21 of the welding transformer 13 is supplied from an alternating current source 23 which may be of the ordinary commercial frequency type through a pair of electric discharge valves 25 and 27. The latter are preferably of the mercury pool immersed ignition electrode type. Each has an anode 29, a mercury pool cathode 31 and an ignition electrode 33 which dips into the mercury pool. The synchronous motor for rotating the rolls may also be energized from the source 23.

Ignition current is supplied to the discharge valves 25 and 27 through associated ignition valves 35 and 37, respectively. The latter are of the hot cathode arc-like discharge type and each valve is provided with an anode 39, a filamentary cathode 41 and a control electrode 43. The ignition circuit for the left-hand main valve 25 extends from the lower terminal 45 of the source 23 through a current limiting resistor 47 in series with the ignition valve 35, the anode 39 and cathode 41 of the ignition valve 35, a conductor 49, the ignition electrode 33 of the main valve 25, a conductor 51, the primary 21 of the welding transformer 13, a conductor 53, to the upper terminal 55 of the source. The ignition circuit for the other main valve 27 extends from the upper terminal 55 of the source 23 through the conductor 53, the primary 21 of the welding transformer, the conductor 51, a conductor 57, a current limiting resistor 59 associated with the other ignition valve 37, the anode and the cathode of the ignition valve, a conductor 61, the ignition electrode 33 and cathode 31 of the main valve 27, a conductor 63 to the lower terminal 45 of the source.

Control potential is supplied to the ignition valves 35 and 37 through a pair of control transformers 65 and 67. The secondaries 69 of the transformers are each connected between the control electrode 43 and the cathode 41 of an associated ignition valve 35 or 37 through suitable biasing sources 71 and 73, respectively.

To initiate a spot welding operation, a manually actuable circuit interrupter 75 which may be a push button or foot switch is closed. The closing of the switch completes a circuit through the exciting coil 77 of a starting relay 79, the upper contact 81 of which closes a circuit through a starting valve 83. The circuit extends from the positive terminal 85 of a voltage divider 87 energized from a direct current source 89 through the upper contact 81, the anode 91 and cathode 93 of the starting valve 83, a conductor 95, a resistor 97 to the negative terminal 99 of the voltage divider.

The control electrode 101 of the starting valve 83 is connected to the cathode 93 thereof through a resistor 103, the secondary 105 of a suitable impulsing transformer 107 and a biasing battery 109. The primary 111 of the impulsing transformer is connected directly across the main source 23. Impulses are thus at all times supplied between the control electrode 101 and the cathode 93 of the starting valve 83. However, unless the contactor 81 closes the anode-cathode circuit of the valve 83, it is non-conductive and when the contactor is first closed, the biasing battery 109 maintains the starting valve non-conductive until the impulse following the closing of the contactor is impressed from the transformer 107. When the latter event occurs, the biasing potential 109 is counteracted and the starting valve 83 is rendered conductive. By proper selection of the magnitude of the resistor 103 in series with the secondary 105 of the impulsing transformer 107, the initiation of the conductivity of the starting valve 83 is adjusted to occur at an instant early in the half period of the source 23. Accordingly, early in one of the half periods of the main source the starting valve 83 is rendered conductive and current is transmitted through the resistor 97 in series therewith.

An auxiliary voltage divider 113 is connected across the resistor 97 in series with the starting valve 83 and a second auxiliary voltage divider 115 is connected across a portion 117 of the main voltage divider 87. Between the adjustable taps 119 and 121 of the auxiliary dividers 113 and 115, respectively, a capacitor 123 is connected through a rheostat 125. One plate 127 of the capacitor is connected to the common junction point 129 of the cathodes 131 of a pair of auxiliary valves 133 and 135. The other plate 137 of the capacitor is connected to the connection point 139 of one of the terminals of each of the secondaries 141 of a pair of transformers 143 and 145. The other terminals of the secondaries 141 are connected each to a control electrode 147 of the auxiliary valves 133 or 135. Power is supplied to the primaries 149 of the transformers 143 and 145 from the main source 23 through a phase shift network 151 of the usual structure comprising a reactor 153 in series with a suitable resistor 155 connected across a supply transformer winding 157 provided with an intermediate tap 159 in the usual manner. The control potential supplied to the auxiliary valves 133 and 135 is thus a composite potential made up of the capacitor potential plus the alternating potential from the phase shift network 151.

Before the welding operation is initiated, the plate 137 of the capacitor is connected directly to the negative terminal of the auxiliary divider 115 through a normally closed contactor 160 of the starting relay 79. A bias potential is thus initially provided for. The auxiliary valves 133 and 135 from the voltage divider 115, and the valves are initially non-conductive.

When the starting valve 83 is rendered conductive, current is transmitted through the auxiliary divider 113 in parallel with its series resistor 97 and the negative potential of the capacitor is decreased at a rate dependent on the magnitude of the rheostat 125 in series therewith. The net potential impressed in the control circuit of each of the valves 133 and 135 is thus a gradually decreasing negative potential on which is superimposed a series of waves having the frequency of the source and displaced in phase with reference to the source by an angle predetermined by the phase shift network 151.

Potential is supplied between the anodes 161 and the cathodes 131 of the auxiliary valves 133 and 135 from the main source 23 through a transformer 163, the secondary 165 of which has an intermediate tap 167 connected to the common junction point 129 of the cathodes 131 of the valves while its terminals are connected to the anodes 161 through suitable ohmic resistors 169 and 171. As the potential of the capacitor 123 gradually rises, the peaks and valleys of the net potential impressed in the control circuits of the auxiliary valves gradually rises. At a predetermined capacitor potential the wave representing the corresponding net potential rises above the critical control potential of the valves 133 and 135 and the valve on which positive anode-cathode happens to be impressed at the time is render conductive. As the potential supplied by the capacitor 123 continues to increase, the instants in the half periods at which the auxiliary valves are rendered conductive occur gradually earlier and thus the auxiliary valves are rendered conductive gradually earlier in their half periods. As each valve 133 or 135 is in its turn rendered conductive, current is transmitted through the corresponding ohmic resistor 169 or 171, respectively.

The primaries 173 of the control transformers 65 and 67 of the ignition valves 35 and 37 are connected directly across the resistors 169 and 171 and when a current flows through an auxiliary valve 133 or 135 and the associated series resistor, a potential is impressed on the corresponding control transformer 65 or 67 and an impulse is impressed in the control circuit of the corresponding ignition valve 35 or 37. The ignition valve is then rendered conductive, current is transmitted through the associated ignition electrode 33 and the corresponding main valve 25 or 27 is rendered conductive and transmits current through the primary 21 of the welding transformer 13. As the potential of the capacitor 123 rises, the ignition valves 35 and 37 and the associated main valves 25 and 27, respectively, are rendered conductive gradually earlier in the half periods of the source 23. After the capacitor potential has increased for a predetermined number of half-cycles, it becomes substantially charged and no further appreciable increase in its potential takes place. At this time, therefore, the main valves 25 and 27 continue to be rendered conductive at the same instants in the half periods.

The magnitude and the rate of rise of the capacitor potential as set by the rheostat 125 and the phase angle and magnitude of the alternating potential superimposed thereon are so adjusted that the current transmitted through the main valves 25 and 27 rises in a number of half periods from a relatively small value to a substantial value. During this time interval the material to be welded is being pre-treated in preparation for the welding operation and this pre-treatment is in accordance with the preferred practice of our invention a pre-heating operation. The number of half periods during which the current rises may be selected in accordance with the properties of the material to be welded and the characteristics desired in the weld. The value which the main valve current reaches when the capacitor 123 is fully charged is equal to the selected welding current and hence after the capacitor has been charged the material is welded.

The number of half periods during which the pre-heating and welding current flows is determined by a second capacitor 175 which is connected in series with a second rheostat 177 across the series resistor 97 in the starting valve circuit. The latter capacitor 175 is short-circuited by the lower contactor 179 of the starting relay 79 when the apparatus is not in operation, but the short-circuit is raised when the starting relay is energized. The capacitor 175 is gradually charged at a rate predetermined by the rheostat 177 when current flows through the starting valve 83 and the series resistor 97. It is, moreover, connected between the control electrode 181 and the cathode 183 of a stop valve 185 through the auxiliary voltage divider 115 connected to the main voltage divider 87. The potential supplied by the auxiliary voltage divider 115 maintains the control electrode 181 negative relative to the cathode 183 and the capacitor potential tends to counteract this negative potential. When the capacitor 175 is uncharged or its potential is below a predetermined value the stop valve 185 is maintained non-conductive by the negative potential impressed through the auxiliary voltage divider 115. When the capacitor 175 has been charged to a substantial potential the stop valve is rendered conductive. The rheostat 177 in series with the capacitor 175 is so adjusted that the latter event occurs only after a number of half periods equal to the sum of the desired pre-heating and welding half periods.

When the stop valve 185 is rendered conductive, the current which it passes flows through a rheostat 186 in circuit with it and through the auxiliary voltage divider 115. The capacitor 123 is connected across a portion of the auxiliary divider 115 through the rheostat 125 and the other auxiliary divider 113. By reason of the increase in current flow through the auxiliary divider 115 arising from the current conducted by the stop valve 185, the tap 119 of the divider 113 now becomes negative relative to the tap 121 of the divider 115 and the charge on the capacitor 123 which is connected to the control electrodes 147 of the auxiliary valves 133 and 135 is gradually counteracted and finally reversed in polarity. The rate at which the original potential of capacitor 123 decreases and reverses in polarity is determined by the rheostat 186 in circuit with the stop valve 185. As the capacitor potential gradually changes its polarity the auxiliary valves 133 and 135 are rendered conductive gradually later in the half periods of the source and the current flow through the material 19 to be welded gradually decreases until it becomes zero. The weld is annealed by the gradually decreasing current. The rate of the annealing depends on the properties of the material 19 and may be set by the rheostat 186.

After a complete pre-heating, welding and annealing operation, another spot welding operation may be initiated by opening the switch 75 and then reclosing it.

The operation of the apparatus is illustrated in Fig. 2. Here potential is plotted vertically and time horizontally. The upper since wave curve 187 represents the anode-cathode potential impressed on one of the auxiliary valves 133 or 135. The U-shaped flat curves 189 under the positive half waves of the curve 187 represent the critical control potential of the valve for the corresponding anode-cathode potential. The curve 191 which smoothly rises from a highly negative value and is asymptotic to the time axis 193 represents the potential drop across the capacitor 123 as it is gradually charged. The curve 194 which starts at the end of the curve 191 and gradually drops to a high negative value represents the effect of recharging the capacitor 123 to the opposite polarity when the stop valve 185 is rendered conductive. The waves 195 built up on the curves 191 and 194 represent the net potential fluctuations obtained by superimposing the out-of-phase potential provided through the phase shift network 151 on the capacitor potential. It is to be noted that the net potential curve 195 intersects the critical curves 189 once during each positive half cycle in the third to the twelfth half cycles counting from the left. The critical curves 189 are intersected gradually earlier in the third, fourth, fifth, sixth and seventh positive half cycles, substantially at the same instant in the next three half cycles and gradually later in the last four. During the periods corresponding to the third, fourth and fifth half cycles, therefore, the auxiliary valves 133 or 135, which is represented, supplies impulses to render the corresponding main valve conductive gradually earlier. The main valve, therefore, supplies the gradually increasing pre-heating current to the material. During the next four half periods the material is welded. During the last four half cycles the current is gradually decreasing and the material is being annealed. The graph for the other auxiliary valve is the same as that shown in Fig. 2 but the polarity of the waves of the curve 187 is reversed to represent supply of current during the negative half periods of the curve 187 actually shown in Fig. 2.

Figure 3:
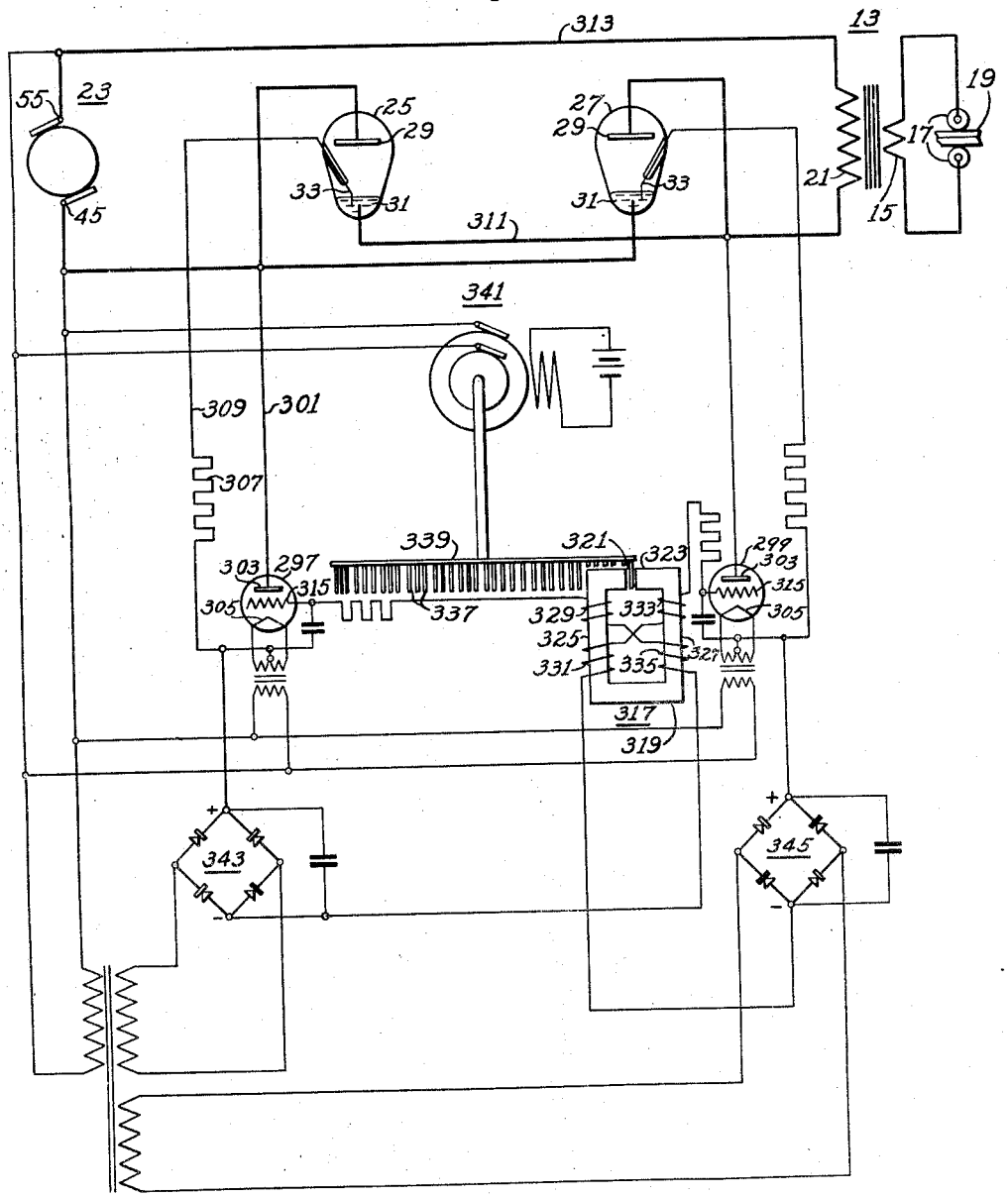
Fig. 3 is a diagrammatic view showing a modification of our invention.

In Figs. 3, 4 and 5 a seam welding system incorporating an adjustable pre-heating and annealing arrangement is shown. In this case each of the main discharge valves 25 and 27 is supplied through a single ignition valve 297 and 299, respectively. The ignition valves 297 and 299 are connected through the ignition electrodes 33 of the main valves 25 and 27 in substantially the same manner as the corresponding elements of the Fig. 1 arrangement. For the left hand valve 25 the ignition circuit extends from the lower terminal 45 of the source 23 through a conductor 301, the anode 303 and cathode 305 of the left-hand ignition valve 297, a suitable current limiting resistor 307, a conductor 309, the ignition electrode 31 and cathode 33 of the left-hand main valve 25, a conductor 311, the primary 21 of the welding transformer 13, a conductor 313 to the upper terminal 55 of the source. The right-hand ignition valve 27 is correspondingly connected.

Each of the ignition valves 297 and 299 is of the arc-like discharge type and is provided with a control electrode 315 in addition to the anode 303 and the cathode 305. Control potential is provided to the valves from an impulsing device 317. The latter comprises a magnetic core 319 of the rectangular structure provided with an air gap 321 centrally disposed in the upper horizontal side 323. On its vertical sides 325 and 327 the core 319 is provided with windings 329 and 331, and 333 and 335, respectively. Impulses are induced in the windings by varying the magnetic flux of the core. This object is accomplished by moving pins 337 of magnetic material mounted in the periphery of a circular disc 339, through the gap 321. The disc is rotated by a synchronous motor 341 and as it rotates the pins successively move through the air gap 321 and vary the flux through the windings 329 to 335.

The upper winding 329 and 333 on each side is connected in series with a lower winding 335 and 331, respectively, on the other side and each set of serially connected windings 329 and 335 and 331 and 333 is connected between the control electrode 315 and the cathode 305 of an ignition device 297 and 299 respectively through suitable biasing sources 343 and 345. As the flux in the core 319 is varied by the pins 337 moving through the air gap, potential impulses are induced in the windings 329 to 335 and impressed between the control electrodes 315 and the cathodes 305 of the ignition valves 297 and 299. The latter are alternately rendered conductive when their anode-cathode potential is positive and in turn render the main valves 25 and 27 conductive.

The speed of rotation of the disc 339 and the arrangement of the pins 337 is such that a positive impulse is impressed between the control electrode 315 and the cathode 305 of the ignition devices 297 and 299 once during each half period of the source 23. However, the impulses attain a magnitude greater than the critical control potential of the ignition valves at instants in the half periods which are predetermined by the setting of the pins. The pins 337 are not spaced uniformly in the disc 339 but in such manner that the impulses impressed occur at the proper instants in the half periods to provide the desired pre-heating, annealing and welding currents through the material 19.

To attain this object, the pins 337 are adjustably arranged in slots 347 along the periphery of the disc 339. From one end of each of the pins 337 a short threaded stud 349 of smaller diameter than the remainder projects. The stud forms a shoulder with the remainder of the pin. To mount the pins 337 in the disc 339, the threaded end 349 is projected through the slotted opening 347, the shoulder engaging the lower face of the disc. The pin is then fastened in the desired position by screwing a knurled nut 351 onto the threaded end and tightening it against the upper face of the disc. The adjustment of the pins 337 in the slots 347 is such that the potential impulses occur in the control circuits of the ignition valves 297 and 299 at the proper instants to initiate the current flow at the desired instants in the half cycles of the source. The pins corresponding to the half periods during which the current should be small are located nearer the ends of the slot to follow when the disc 339 rotates so that current flow through the load is initiated late in the half periods. For large current the pins 337 are nearer the leading ends of the slots.

In the lower portion of Fig. 4, the manner in which the pins 337 would be arranged for one complete weld including the pre-heating and the annealing intervals is illustrated. The disc may be assumed to rotate in the direction of the arrow 353, i. e., clockwise. It is to be noted that the extreme left-hand pin is at the right-hand end of its slot. Because the pin is in this position, the corresponding main valve 25 or 27 will be rendered conductive late in the half period of anode-cathode potential applied thereto. The next pin is somewhat displaced from the right-hand end of the slot and, therefore, is in a position to render the corresponding main valve conductive somewhat earlier in the half period. The next two pins are in positions corresponding to still earlier ignition. The four pins on the left just discussed provide for the ignition of the auxiliary valves 297 and 299 and the main valves 25 and 27 during the pre-heating interval. The next pin is near the left-hand end of the slot and is thus set to provide the first welding half period. The next two pins are in the same relative positions and are also set for welding. Finally, the last three pins are displaced towards the right-hand ends of their associated slots substantially in the same manner as the four pins on the left, and they are thus positioned so that the main discharge valves 25 and 27 pass the annealing current.

It is to be noted that in the above-discussed arrangement, the pre-heating current gradually rises to the welding value and the annealing current gradually falls to the zero value from the welding value. In many instances, this gradual rise of the pre-heating current and gradual fall of the annealing current will not be desirable or necessary. In such cases, of course, the pins may be arranged in such manner that the current for pre-heating or annealing follows whatever program is desired. For example, it may be desirable that the pre-heating current shall be constant and the annealing current decrease gradually from the welding value. In such a case, the pins 337 on the left set for pre-heating may be disposed in the same relative positions in their slots so that the constant desired pre-heating current is attained and the pins on the right set for annealing may be disposed in positions in their slots which are nearer to the right from slot to slot to correspond to the desired gradual decrease for the annealing current.

Figure 6:
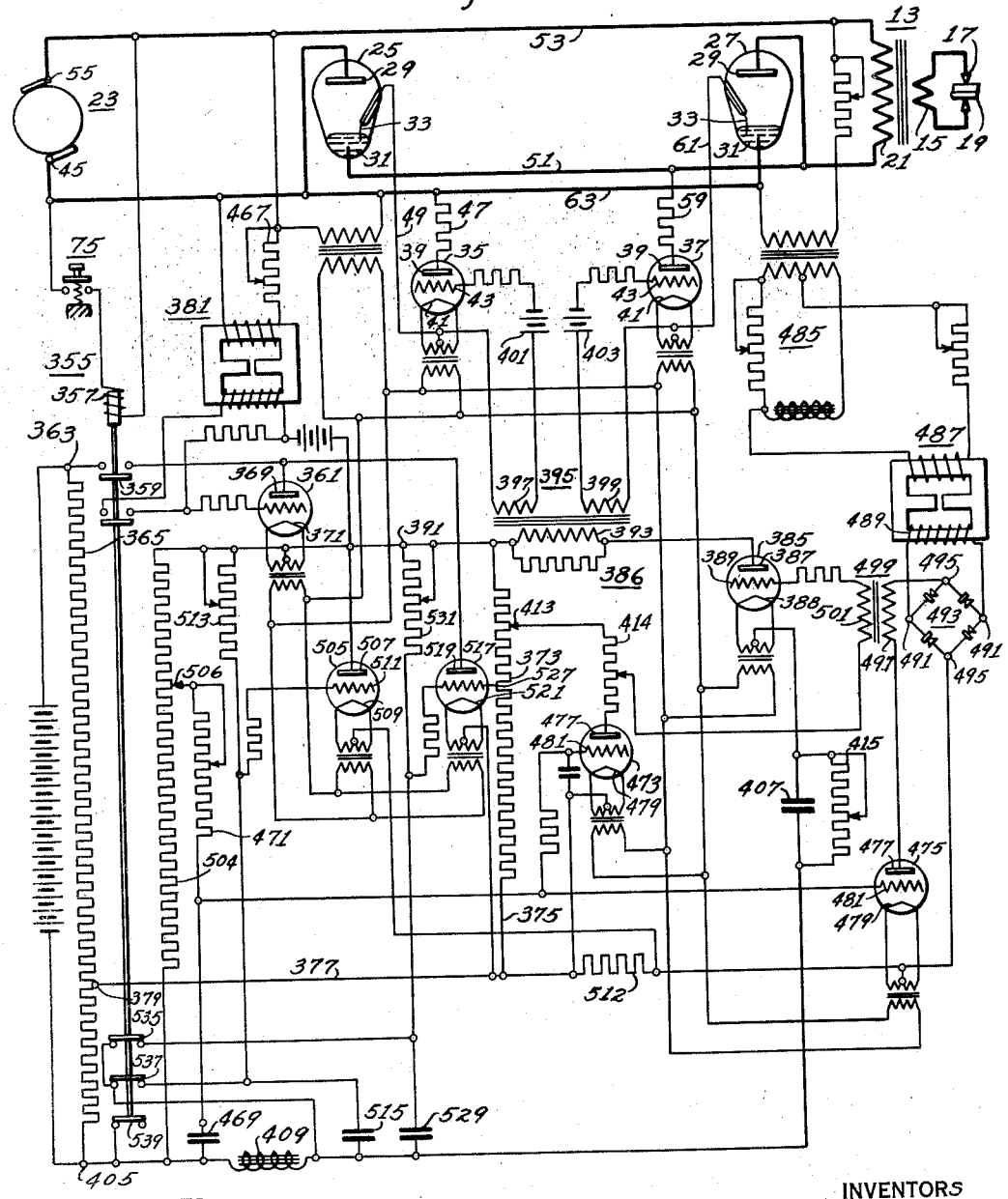
Fig. 6 is a diagrammatic view showing a further modification of our invention.

In general, the preferred current program for welding purposes is one in which the current is gradually increased to the welding value for pre-heating and gradually decreased from the welding value for annealing. Since this program will often be used in practice, we have provided an arrangement with a minimum of movable elements for attaining the desired operation. This arrangement is shown in Fig. 6 as embodied in a spot welding system. It may also, however, be used for seam welding purposes, in which case it need only incorporate some contrivance for causing the operation to repeat continuously at the desired speed.

The Fig. 6 arrangement is similar to the Fig. 1 arrangement in incorporating the usual main discharge valves 25 and 27 with which are associated the ignition discharge valves 35 and 37. The main and ignition discharge valves are connected in the system shown in Fig. 6 in the same manner as the corresponding elements are connected in the Fig. 1 apparatus. The operation of the apparatus shown in Fig. 6 is started by the closing of the manually actuable switch 75. The switch 75 closes a circuit through the exciting coil 355 of a starting relay 357 and the relay is energized. When the relay is energized, its upper movable contactor 359 closes a circuit through a starting valve 361. The latter circuit extends from the positive terminal 363 of a main voltage divider 365 through the upper contactor 359 of the relay 357, the anode 369 and cathode 371 of the starting valve 361, an auxiliary voltage divider 373, a conductor 375, a conductor 377, to the lowest adjustable tap 379 on the main voltage divider.

The starting valve 361 is provided with ignition potential from a peaking transformer 381 of substantially the same structure as in the Fig. 1 arrangement, and when a positive impulse is supplied by the peaking transformer in the control circuit of the starting valve the latter is rendered conductive and current flows in its anode-cathode circuit and through the auxiliary voltage divider 373. The potential provided by the auxiliary divider is impressed on a valve 385 of the arc-like discharge type connected in an inverter circuit 386. The valve 385 is provided with an anode 387, a cathode 388 and a control electrode 389. The anode 387 of the inverter valve 385 is connected to the positive terminal 391 of the auxiliary divider 373 through the primary 393 of a control transformer 395. The control transformer is provided with a pair of secondaries 397 and 399 which are connected respectively between the control electrodes 43 and the cathodes 41 of the ignition valves 35 and 37 through suitable biasing sources 401 and 403. The cathode 388 of the inverter valve 385 is connected to the negative terminal 405 of the main voltage divider 365 through a capacitor 407 and a suitable reactor 409. The inverter circuit 386 is completed through the conductors 377 and 375 connected to the lowest adjustable tap 379 of the main voltage divider.

The control electrode 389 of the inverter valve 385 is connected to the adjustable tap 413 of the auxiliary divider 373 through a portion of another auxiliary voltage divider 414. The tap 413 is disposed at a point on the divider 373 such that a predetermined bias potential is provided between the control electrode 389 and the cathode 388 of inverter valve.

When the auxiliary divider 373 is energized, potentials are supplied between the control electrode 389 and the cathode 388 and the anode 387 and the cathode of the inverter valve 385 and current flows therethrough to charge the capacitor 407. By reason of the presence of the reactor 409 in the charging circuit of the capacitor, the potential impressed on the capacitor rises to a value greater than the anode-cathode potential impressed through the auxiliary voltage divider 373. Since the potential impressed on the capacitor is of opposite polarity to the potential supplied by the auxiliary divider, the inverter valve is eventually extinguished and the capacitor is discharged through a resistor 415 in parallel therewith. After this the inverter valve 385 is again rendered conductive and the above steps are repeated. Since the capacitor 407 is initially uncharged, the potential impressed between its plates during the initial charging rises to a higher value than during the later chargings.

The capacitor 407 in the anode-cathode circuit of the inverter valve 385 is also connected, in the control circuit of the valve in series with portions of the voltage dividers 365 and 373. The capacitor 407, when charged, provides a negative potential in the control circuit of the valve 385 and the potential supplied by the auxiliary divider 373 tends to counteract the potential. The instant at which the potential is counteracted and therefore, the periodicity of the inverter circuit 386 is determined by the setting of the divider 373.

Figure 7:
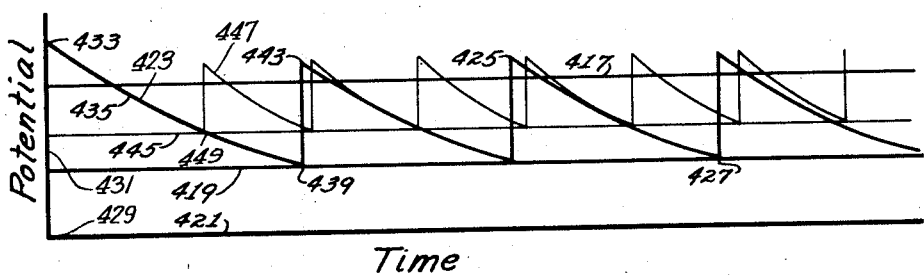
Figs. 7 to 9 are graphs illustrating the operation of the inverter used in the practice of our invention according to Fig. 6.
Figure 8:
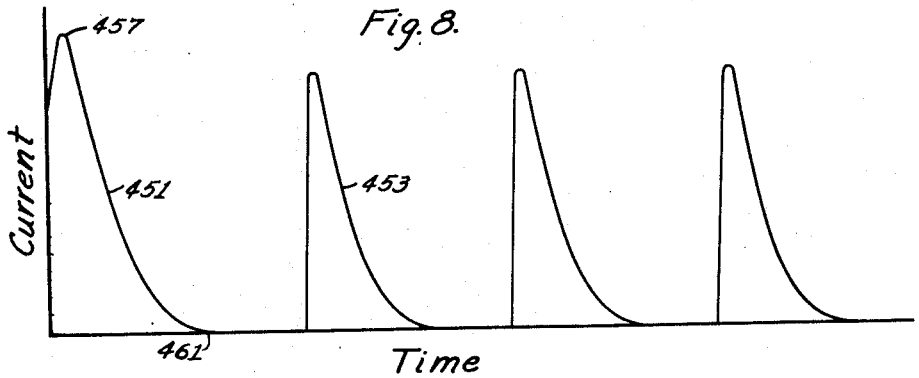
Figure 9:
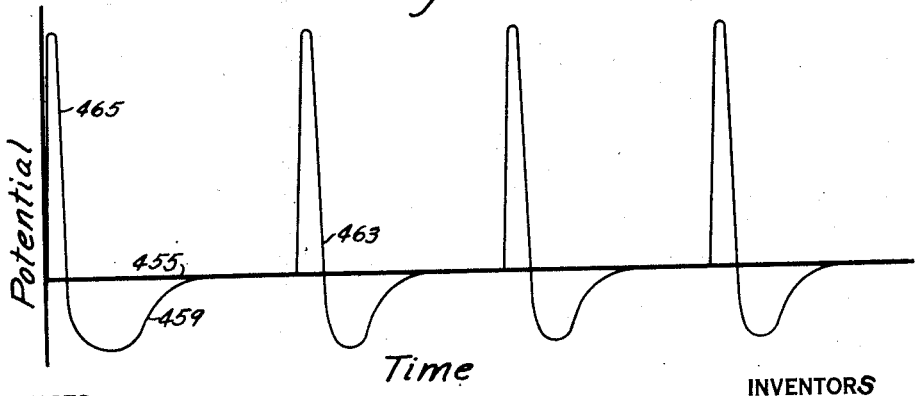

The operation of the inverter is graphically illustrated in Figs. 7, 8 and 9. In Fig. 7, potential is plotted vertically and time horizontally. The heavy horizontal line 417 near the top of the graph represents the anode-cathode potential which is supplied to the inverter valve 385 from the auxiliary voltage divider 373. The medium heavy horizontal line 419 just above the time axis 421 represents the critical control potential of the inverter valve. The height of the line 419 is determined by the potential supplied by the main voltage divider 365 from the negative terminal 405 to the tap 379 and by the potential supplied by the auxiliary divider 373 at the point 413. The medium heavy curve 423 having cusps 425 and 427 at the top and bottom represents the potential across the capacitor 407.

For the purpose of explanation, it may be assumed that the operation begins at the origin 429 of the co-ordinates. At this point, the inverter valve 385 is rendered conductive and as the capacitor 407 is charged, the potential impressed between its plates is represented by the first vertical branch 431 of the curve 423. The first branch intersects the line 417 representing the voltage divider potential and above this intersection, the anode-cathode potential impressed on the valve is negative. The first cusp 433, therefore, represents the first point at which the inverter valve 385 is extinguished. After the extinction of the valve, the capacitor 407 discharged through its parallel resistor 415 and the potential between its plates decreases in correspondence with the first concave branch 435 of the curve 423. The decrease would continue until the capacitor 407 is substantially discharged; however, before the capacitor is completely discharged, the potential across it decreases below the critical value, as represented by the second cusp 439 which is the intersection of the branch 435 with the line 419 representing the critical potential. Since at the point 439 the auxiliary voltage divider potential (line 417) is greater than the capacitor potential (curve 423) all the conditions necessary for the energization of the inverter valve exist and it is again rendered conductive. The capacitor potential now rises rapidly until the voltage divider line 417 is again intersected. Above this point, another cusp 443 is produced in the curve and the above discussed process is repeated.

It is seen that the periodicity of the potential impressed across the capacitor 407 is determined by the points at which the curve 423 representing the potential of the capacitor intersects the critical potential line 419 and, therefore, by the height of the line above the time axis 421. How this periodicity can be changed by raising the line, i. e., by rendering the bias potential more positive, is illustrated by the light line 445 above the critical potential line 419 and the associated light curve 447. With the bias potential raised to that corresponding to the light line 445, the first concave branch 435 of the capacitor potential curve 423 cuts the bias potential line 445 at the cusp 449 considerably earlier than it cuts the lower bias potential line. The earlier intersection of the curve 447 and the light line 445 is repeated for the other portions of the curve and the frequency is correspondingly greater.

When the inverter valve is rendered conductive, it transmits current pulses through the primary 393 of the control transformer 395. The wave form of these pulses is illustrated in Fig. 8, in which current is plotted vertically and time horizontally. Only the pulses corresponding to the moderately heavy potential curve in Fig. 1 are plotted.

As can be seen from the first curve 451 of Fig. 8, the current through the primary of the ignition control transformer rises abruptly to a substantial value as the capacitor is charged. The current lags slightly behind the charge of the capacitor in rising to a peak because of the reactance of the primary and then decreases gradually to zero. After falling to zero, the current through the primary 393 remains zero until the inverter valve 385 is again rendered conductive and this occurs at a time corresponding to the second cusp 439 of the capacitor potential curve. Another current cycle as represented by the second curve 453 of Fig. 8 similar to the first one continues from the point 439 and the same process is repeated indefinitely as long as the inverter circuit 386 is operating.

The current flow through the primary 393 of the control transformer 395 produces potentials in the secondaries 397 and 399. The wave form of these potentials is represented in Fig. 9, in which potential is plotted vertically and time horizontally. As can be seen from the first curve 455, the secondary potential rises abruptly to a maximum value in correspondence with the slope of the left-hand portion of the current curve 451 in Fig. 8 and drops to zero at the instant when the peak 457 in the current curve occurs. The curve then continues as a relatively wide and shallow negative loop 459 which rises to zero at a point corresponding to the point 461 at which the current curve 451 in Fig. 8 falls to zero. There is then an interruption corresponding to the interruption of current flow through the primary and after this another similar potential wave 463 is produced.

In designing the apparatus, the capacitor 407 and the reactor 409 are so selected that the frequency of the secondary potential, as illustrated in Fig. 9, is approximately twice the frequency of the source potential so that a complete inverter potential wave consisting of a narrow positive portion 465 and a flat wide negative portion 459 is produced during each half period of the source potential. There is, therefore, impressed during each half period of the source, a positive ignition potential in the control circuits of both of the ignition valves 35 and 37 so that one or the other may be rendered conductive.

The actual frequency of the inverter circuit, as precisely set by the biasing potential provided by the voltage dividers 365 and 373, is, however, somewhat greater than twice the frequency of the source 23 when the inverter operation is first started. The positive pulses 465 of the secondary potential 455, therefore, occur earlier and earlier in the half periods of the source 23. Moreover, the peaking transformer 381 associated with the starting valve and its associated series resistor 467 are of such character that the starting valve is rendered conductive late in one of the half periods of the source 23 and, therefore, the first pulse produced in the inverter circuit 386 occurs late in this half period and one of the main valves 25 or 27 is rendered conductive late in the half period. Hence, the first pulse of current which flows through the primary 21 of the welding transformer 13 is a relatively small pulse beginning late in the half period of the source. Since the frequency of the impulses now provided by the inverter circuit 386 for rendering the ignition valves 35 and 37 conductive is greater than the frequency of the source 23, the points in the half periods at which the main valves are rendered conductive thereafter occur gradually earlier and, therefore, the current flow gradually increases.

After the current flow through the material 19 has gradually increased for a predetermined number of half periods, it reaches the welding value and to continue the flow of welding current for a predetermined time interval the inverter circuit 386 is locked into synchronism with the main source. For this purpose a capacitor 469 is provided in the principal circuit of the starting valve 361. When the starting relay is rendered conductive the capacitor 469 is charged through a suitable rheostat 471 by the anode-cathode current flowing through the starting valve. The capacitor controls the current flow through a pair of electric discharge valves 473 and 475. Each of the valves 473 and 475 is of the arc-like discharge type having an anode 477, a cathode 479 and a control electrode 481. The control electrodes 481 of the valves are both connected to the junction point of the rheostat 471 and the capacitor 459. The cathodes 479 of the two valves 473 and 475 are connected to the tap 379 of the main voltage divider 365.

The lock-in impulses are supplied to the inverter circuit through the valve 475. Anode-cathode potential is provided for this valve from the main source 23 through a phase shift network 485 and a suitable peaking transformer 487. The secondary 489 of the transformer 487 is connected to the input terminals 491 of a full wave rectifier 493 and the direct current terminals 495 of the rectifier are connected between the anode 477 and cathode 479 of the lock-in valve 475 through the primary 497 of a control transformer 499. The secondary 501 of the transformer is connected in the control circuit of the inverter valve 385 and when the lock-in valve 475 is conductive, impulses having twice the frequency of the source are impressed in the control circuit of the inverter valve.

For the purpose of charging the capacitor 469 the starting valve 361 conducts current through an auxiliary voltage divider 504. The rheostat 471 and the capacitor 469 are connected between the adjustable tap 506 of the divider 504 and its negative terminal.

Initially, the lock-in valve is maintained non-conductive by the potential drop between tne negative terminal 405 and the intermediate tap 379 of the voltage divider 365. This potential is impressed between the control electrode 481 and the cathode 479 through the capacitor 469 and, as the capacitor is charged, is counteracted by the capacitor potential. The setting of the rheostat 471 in series with the capacitor 469 is such that after the time required for the preheating operation has expired the potential of the capacitor rises to a value such that the lock-in valve 475 is rendered conductive and lock-in impulses are supplied on the control circuit of the inverter valve 385.

However, the lock-in frequency, being precisely twice the frequency of the source, is necessarily less than the frequency at which the inverter circuit 386 oscillates just before the lock-in impulses are impressed. An inverter circuit 386 of the type involved here oscillating at a given frequency cannot be locked in at a somewhat smaller frequency by the application of impulses in the control circuit of the inverter valve 385, since such impulses must necessarily occur, after the valve has been rendered conductive, and therefore have no effect. The difficulty involved here is overcome by the other valve 473. The anode 477 of this valve is connected to the adjustable tap 413 of the auxiliary voltage divider 373 through the auxiliary divider 414 and its control electrode 481 and cathode 479 are connected to the same points as the corresponding elements of the lock-in valve 475. The valve 473 is, therefore, rendered conductive simultaneously with the lock-in valve and when this occurs a potential component is added in the control circuit of the inverter valve 385 which renders the net potential impressed on the control electrode more negative (lowers line 419 Fig. 7). The characteristic frequency of the inverter circuit 386 is therefore decreased and is now less than the frequency of the source 23. There is, therefore, now no impediment to the locking in of the inverter circuit at the frequency of the source and when the valves 473 and 475 are rendered conductive the inverter circuit supplies current to the transformer 395 which has twice the frequency of the source. Moreover, the phase shift network 485 is so set that the potential impulses provided by the lock-in valve occur at instants in the half periods of the source for which the current flow through the material 19 is equal to the desired welding current.

To stop the flow of welding current and initiate the annealing, a further valve 505, which we may designate as the annealing valve is provided. The latter is provided with an anode 507, a cathode 509 and a control electrode 511 and is of the arc-like discharge type. The anode 507 of the annealing valve 505 is connected to the cathode 371 of the starting valve 361 and the cathode 509 of the valve is connected directly to the cathode 479 of the valve. It is moreover connected to the tap 379 of the main voltage divider 365 and to the cathode 479 of the valve 473 through a resistor 512. Between the anode and the control electrode 511 of the annealing valve a rheostat 513 is connected and between its control electrode and the negative terminal 405 of the divider 365, a capacitor is connected through the reactor 409. The capacitor 515 is charged through the starting valve 361 and the rheostat 513. When the inverter valve 385 is conductive, current is transmitted through the reactor 409. At the instant that the inverter valve is rendered non-conductive, the decay of flux in the reactor 409 gives rise to a potential having a positive polarity at the point where the reactor is connected to the capacitor 515. The rheostat 513 is so adjusted that at a predetermined interval of time after the lock-in valve 475 has become conductive, which is equal to the desired welding time, the positive potential impressed by the capacitor 515 and the reactor 409 between the control electrode 511 and the cathode 509 of the annealing valve rises to a value such that the main voltage divider potential is counteracted and the valve is rendered conductive. Since the reactor potential is impressed just after the inverter valve 385 becomes non-conductive, annealing valve 505 is rendered conductive just after the valve 385 becomes conductive and the latter is prevented from becoming prematurely conductive by reason of leakage of charge from capacitor 469. The net potential impressed between the control electrode and the cathode 509 of the annealing valve at the instant when the inverter valve is rendered non-conductive, is therefore composed of a negative biasing potential impressed between the points 405 and 379 of the divider 365 and a counteracting positive potential provided by the capacitor 515 and the reactor 409.

The current flow through the annealing valve 505 is in a circuit extending from the positive terminal 363 of the voltage divider 365, through the contactor 359 of the starting relay, the anode 369 and the cathode 371 of the starting valve 361, the anode 507 and the cathode 509 of the annealing valve 505, the resistor 512 to the tap 379. By reason of the current flow through the resistor 512 a bias potential is impressed between the control electrode 481 and the cathode 479 of the valve 475. The latter valve is, therefore, rendered non-conductive and the supply of lock-in impulses to the inverter valve 385 is discontinued.

The valve 473, however, remains conductive and the inverter 386 now operates at a frequency lower than twice the source frequency as determined by the valve 473. The main valves 25 and 27 are, therefore, alternately rendered conductive later and later in the half periods of the source until the current flow through the welding load 19 is reduced substantially to zero.

The operation is completely terminated by a stop valve 517, the anode 519 and cathode 521 of which are connected between the positive terminal 363 of the main voltage divider 365 and the tap 379. Another rheostat 531 is connected between the cathode 371 of the starting valve 361 and the control electrode 527 of the stopping valve 517. A capacitor 529 is connected between the control electrode 527 and the negative terminal 405 of the divider 365 through the reactor 409. As in the case of the annealing valve 505, the potentials impressed in the control circuit of the stop valve 517 are the negative potential, between the points 405 and 379, and the positive potential of the capacitor 529 and the reactor 409.

The rheostat 531 is so set that the capacitor 529 is charged to a substantial positive potential which, together with the reactor potential is sufficient to counteract the bias potential at the end of the annealing interval just after the valve 385 is rendered non-conductive. At this point, the stop valve 517 is rendered conductive. The stop valve 517, when conductive, limits the current flow through the auxiliary divider 373 to a low value because it reduces the total drop through the start valve 351 and the divider 373 to a value equal to the arc-drop across the stop valve 517. The same is of course true for the auxiliary divider 414. The control electrode 389 of the inverter valve 385 is, therefore, substantially at the potential of the anode 387 and the valve becomes permanently conductive. Since this occurs just after the inverter valve has become non-conductive and the capacitor 407 remains substantially charged, the main valves 25 and 27 are not again rendered conductive.

To repeat the operation the manual switch 75 is released, the capacitors 469, 515 and 529 are discharged through the lower contactors 535, 537 and 539, respectively, of the starting relay and then the manual switch is reclosed. For seam welding purposes, it is only necessary to replace the manual switch by some regularly repeating device as, for example, a synchronously driven commutator.

The operation of the Fig. 6 apparatus is illustrated in Figs. 10 to 12. In these views potential is plotted vertically and time horizontally. In Fig. 10 the potential of the capacitor 407 in the inverter circuit 386 is represented by the cusped curve 541. The left-hand horizontal line 543 above the time axis 545 represents the biasing potential applied during the pre-heating interval. The horizontal line 547 to the right represents the biasing potential supplied during the welding interval when the inverter is locked and during the annealing interval.

In Fig. 11 the lock-in potential provided through the control transformer 499 is plotted as a function of time. In the particular example illustrated, three lock-in impulses are provided as represented by the three pulse-like curves 551. It will be noted by reference to Fig. 10 that the inverter valve 385 is rendered conductive by the lock-in impulses before the capacitor 407 reaches the potential of the biasing line 547. The broken line extensions 553 of the fourth, fifth and sixth concave branches 555 of the cusped curve 541 in Fig. 10 represent the situation which exists if the lock-in impulses were not supplied. In such a case, the inverter valve would be rendered conductive at the points determined by the intersection of the broken line curves 553 and the critical line 547. It will be noted that the period corresponding to the latter intersections is substantially different than the period of the lock-in impulses 551.

In Fig. 12, the sine curve 557 represents the potential of the source as a function of time. The period of this curve is twice the period of the lock-in impulses 551 in Fig. 11. The sine curve may be regarded as representing the anode-cathode potential impressed on one of the ignition valves 35 or 37. The impulses impressed in the control circuit of the same ignition valves are represented by the unsymmetric impulse-like curves 559 in Fig. 12. It will be noted that the first four of these impulse curves have positive branches 561 which occur gradually earlier in the half periods of the sine wave curve 557. The positive branches represent potentials whereby the ignition valves 35 and 37 are rendered conductive. During these half periods, accordingly, the ignition valve 35 or 37 and, therefore, the corresponding main valve 25 or 27 is rendered conductive gradually earlier. The current supplied to the load, therefore, increases gradually from a low value to a substantial value in accordance with the pre-heating program desired. The fifth, sixth and seventh impulse curves 559 occur substantially at the same instant in corresponding half periods of the sine curve 557 to provide the constant welding current desired. The eighth and ninth impulse curves become positive gradually later in their corresponding half periods and provide the desired annealing current.

The curves shown in Figs. 10 to 12 correspond to one of the main valves 25 or 27. The curves for the other valve will be precisely similar except that the current flow will take place during the alternate half cycles so that actually a current impulse is supplied to the welding load during each half cycle of the source.

Although we have shown and described certain specific embodiments of our invention, we are fully aware that many modifications thereof are possible. Our invention, therefore, is not to be restricted except insofar as is necessitated by the prior art and by the spirit of the appended claims.

We claim as our invention:

1. For use with apparatus for spot welding a material from a periodically pulsating source, the combination comprising valve means interposed between said source and a spot on said material for controlling the supply of current to said spot, control means for said valve means, said valve means to be rendered conductive by the application of a potential greater than a predetermined critical value to said control means, and means for applying to said control means a periodic potential having a substantially sloping wave front superimposed on a potential which gradually increases in magnitude in such manner that the net potential applied rises above the critical value gradually earlier in the pulsations of said source, the current conducted during the earlier pulsations being insufficient for welding and that conducted during the later pulsations being sufficient for welding.

2. For use with apparatus for spot welding a material from a periodically pulsating source, the combination comprising valve means interposed between said source and a spot on said material for controlling the supply of current to said spot, control means for said valve means, said valve means to be rendered conductive by the application of a potential greater than a predetermined critical value to said control means, and means for applying to said control means a periodically pulsating potential of the same frequency as said source, displaced in phase relative to the pulsations of said source and having a substantially sloping wave front, superimposed on a potential which gradually increases in magnitude in such manner that the net potential applied rises above the critical value gradually earlier in each of the pulsations of said source, the current conducted during the earlier pulsations being insufficient for welding and that conducted during the later pulsations being sufficient for welding.

3. For use with apparatus for supplying a load from a periodically pulsating source, the combination comprising valve means interposed between said source and said load for controlling the supply of current to said load, control means for said valve means, said valve means to be rendered conductive by the application of a potential greater than a predetermined critical value to said control means, and means for applying to said control means a periodically pulsating potential of the same frequency as said source, displaced in phase relative to the pulsations of said source and having a substantially sloping wave front, superimposed on a potential which gradually increases in magnitude in such manner that the net potential applied rises above the critical value gradually earlier in each of the pulsations of said source, the first said potential being applied from an auxiliary source and the second said potential being applied from a circuit including a capacitor and means for gradually charging said capacitor, said capacitor being in series with said auxiliary source.

4. For use with apparatus for supplying a load from a periodically pulsating source the combination comprising valve means interposed between said source and said load for controlling the supply of current to said load, control means for said valve means, said valve means being rendered conductive by the application of a potential impulse to said control means, and means for applying to said control means a potential having a frequency greater, by a small amount, than said source frequency, during a first predetermined number of pulsations of said source, a potential having a frequency substantially equal to said source frequency during a second predetermined number of pulsations of said source, and a potential having a frequency less, by a small amount, than said source frequency, during a third predetermined number of pulsations of said source.

5. Apparatus according to claim 4 characterized by the fact that the potential applying means includes an inverter circuit incorporating a discharge path having a control electrode, the frequency of said inverter circuit being determined by the bias impressed on said control electrode, means for applying a first bias potential to cause said inverter to operate at a frequency greater than the source frequency, means for applying a second bias potential to cause said inverter to operate at a frequency less than said source frequency and means for locking said inverter in synchronism with said source frequency.

6. In combination with a source of current, an electric discharge device comprising a control electrode and a plurality of principal electrodes, a capacitor and inductive reactance means in series with said source and the principal electrodes of said device, a control circuit for said device including said capacitor, one of said principal electrodes and said control electrode, and means for applying a potential which may be adjusted to any desired value at will in said control circuit.

7. In combination with a source of current, an electric discharge device comprising a control electrode and a plurality of principal electrodes, a capacitor and inductive reactance means in series with said source and the principal electrodes of said device, means for applying between said control electrode and one of said principal electrodes a first potential having a predetermined value, means for applying between said control electrode and said one principal electrode a second potential having a different value and means for applying between said control electrode and said one principal electrode a third potential having a still different value, the values of said first and second potential being such that said capacitor is charged and discharged at a frequency greater than a predetermined frequency when said first potential is applied and at a frequency less than a predetermined frequency when said second potential is applied and the value of said third potential being such that said device is rendered non-conductive.

8. In combination with a source of current, an electric discharge device comprising a control electrode and a plurality of principal electrodes, a capacitor and inductive reactance means in series with said source and the principal electrodes of said device, means for applying between said control electrode and one of said principal electrodes a first potential having a predetermined value for a predetermined time interval, means for applying between said control electrode and said one principal electrode a second potential having a different value during a second predetermined time interval, which commences after the application of said first potential, means for applying a potential of a predetermined frequency between said control electrode and said one principal electrode for a predetermined time interval between the applications of said first and second potentials and means for applying between said control electrode and said one principal electrode a third potential having a still different value, the values of said first and second potentials being such that said capacitor is charged and discharged at a frequency greater than said predetermined frequency when said first potential is applied and at a frequency less than said predetermined frequency when said second potential is applied and the value of said third potential being such that the device is rendered non-conductive.

9. In combination with a source of substantially constant direct current, an electric discharge device comprising a control electrode and a plurality of principal electrodes, a capacitor and inductive reactance means in series with said source and the principal electrodes of said device, means for applying between said control electrode and one of said principal electrodes a first substantially constant direct current potential having a predetermined value for a predetermined time interval, means for applying between said control electrode and said one principal electrode a second substantially constant direct current potential having a different value during a second predetermined time interval, which commences after the application of said first potential, means for applying a potential of a predetermined frequency between said control electrode and said one principal electrode for a predetermined time interval between the applications of said first and second potentials and means for applying between said control electrode and said one principal electrode a third potential having a still different value, the values of said first and second potentials being such that said capacitor is charged and discharged at a frequency greater than said predetermined frequency when said first potential is applied and at a frequency less than said predetermined frequency when said second potential is applied and the value of said third potential being such that the device is rendered non-conductive.

10. Apparatus according to claim 8 characterized by the fact that the means for applying the first, second and third potentials and the potential of a predetermined frequency each include at least one electric discharge valve, and means for so interconnecting said valves that they are rendered conductive in succession, each valve effecting the energization of the valve included in the means whereby the potential following that applied through its associated means is applied.

11. In combination with a source of current, an electric discharge device comprising a control electrode and a plurality of principal electrodes, a capacitor and inductive reactance means in series with said source and the principal electrodes of said device, said capacitor being in circuit with said control electrode, means for applying between said control electrode and one of said principal electrodes a first potential having a predetermined value, means for applying between said control electrode and said one principal electrode a second potential having a different value and means for applying between said control electrode and said one principal electrode a third potential having a still different value, the values of said first and second potential being such that said capacitor is charged and discharged at a frequency greater than a predetermined frequency when said first potential is applied and at a frequency less than a predetermined frequency when said second potential is applied and the value of said third potential being such that said device is rendered non-conductive.

12. In combination with a source of current, an electric discharge device comprising a control electrode and a plurality of principal electrodes, a capacitor and inductive reactance means in series with said source and the principal electrodes of said device, said capacitor being in circuit with said control electrode, means for applying between said control electrode and one of said principal electrodes a first potential having a predetermined value for a predetermined time interval, means for applying between said control electrode and said one principal electrode a second potential having a different value during a second predetermined time interval, which commences after the application of said first potential, means for applying a potential of a predetermined frequency between said control electrode and said one principal electrode for a predetermined time interval between the applications of said first and second potentials and means for applying between said control electrode and said one principal electrode a third potential having a still different value, the values of said first and second potentials being such that said capacitor is charged and discharged at a frequency greater than said predetermined frequency when said first potential is applied and at a frequency less than said predetermined frequency when said second potential is applied and the value of said third potential being such that the device is rendered non-conductive.

13. In combination with a source of substantially constant direct current, an electric discharge device comprising a control electrode and a plurality of principal electrodes, a capacitor and inductive reactance means in series with said source and the principal electrodes of said device, said capacitor being in circuit with said control electrode, means for applying between said control electrode and one of said principal electrodes a first substantially constant direct current potential having a predetermined value for a predetermined time interval, means for applying between said control electrode and said one principal electrode a second substantially constant direct current potential having a different value during a second predetermined time interval, which commences after the application of said first potential, means for applying a potential of a predetermined frequency between said control electrode and said one principal electrode for a predetermined time interval between the applications of said first and second potentials and means for applying between said control electrode and said one principal electrode a third potential having a still different value, the values of said first and second potentials being such that said capacitor is charged and discharged at a frequency greater than said predetermined frequency when said first potential is applied and at a frequency less than said predetermined frequency when said second potential is applied and the value of said third potential being such that the device is rendered non-conductive.

14. For use with apparatus for supplying a load from a periodically pulsating source, the combination comprising valve means interposed between said source and said load for controlling the supply of current to said load, control means for said valve means, said valve means to be rendered conductive by the application of a potential greater than a predetermined critical value to said control means, and means for applying to said control means a periodically pulsating potential of the same frequency as said source, displaced in phase relative to the pulsations of said source and having a substantially sloping wave front, superimposed on a potential which gradually increases in magnitude during a first predetermined number of pulsations of said source then remains substantially constant during a second predetermined number of source pulsations and then gradually decreases, said latter potential having a magnitude sufficient that the net potential applied first rises above the critical value gradually earlier in each of said first predetermined number of source pulsations and at the same relative instant in each of said second predetermined number of source pulsations and thereafter gradually later in each of the source pulsations.

JOHN W. DAWSON.
RALPH N. STODDARD.